Sept. 5, 1967 J. W. DRENNING ETAL 3,340,125
ADHESIVE BONDING METHOD AND APPARATUS
Filed Dec. 18, 1964 3 Sheets-Sheet 1
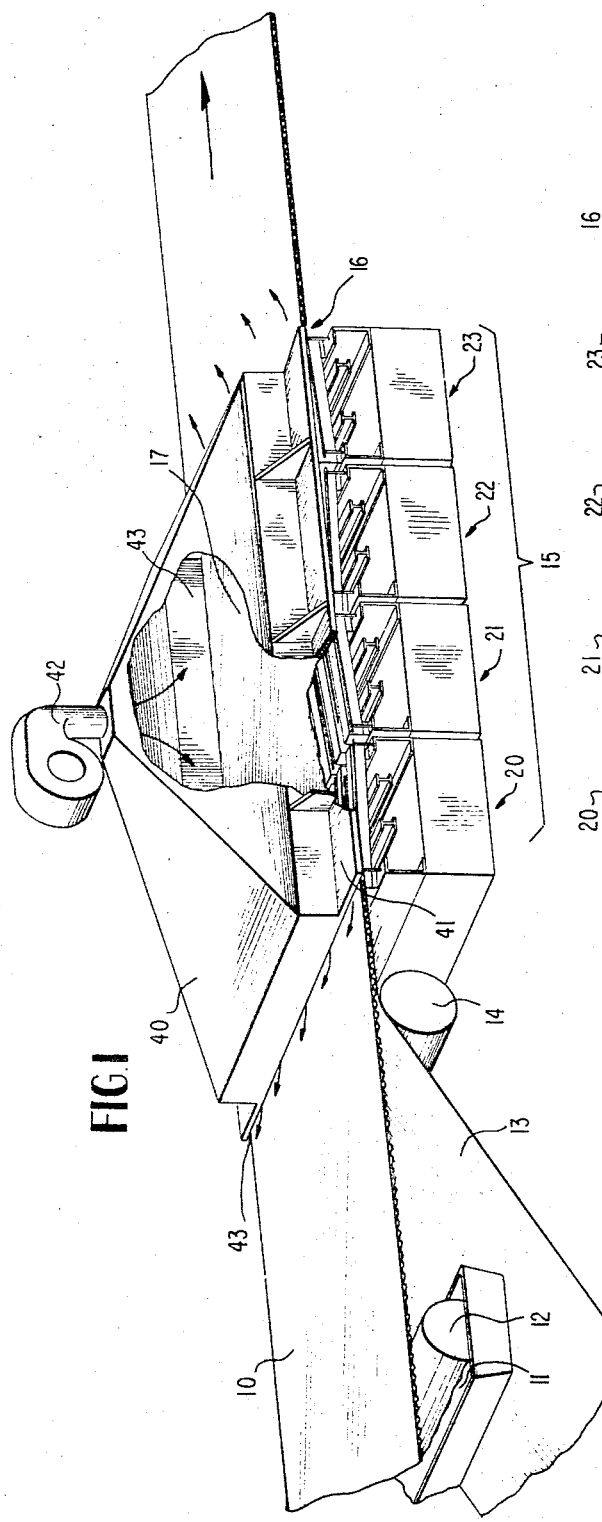
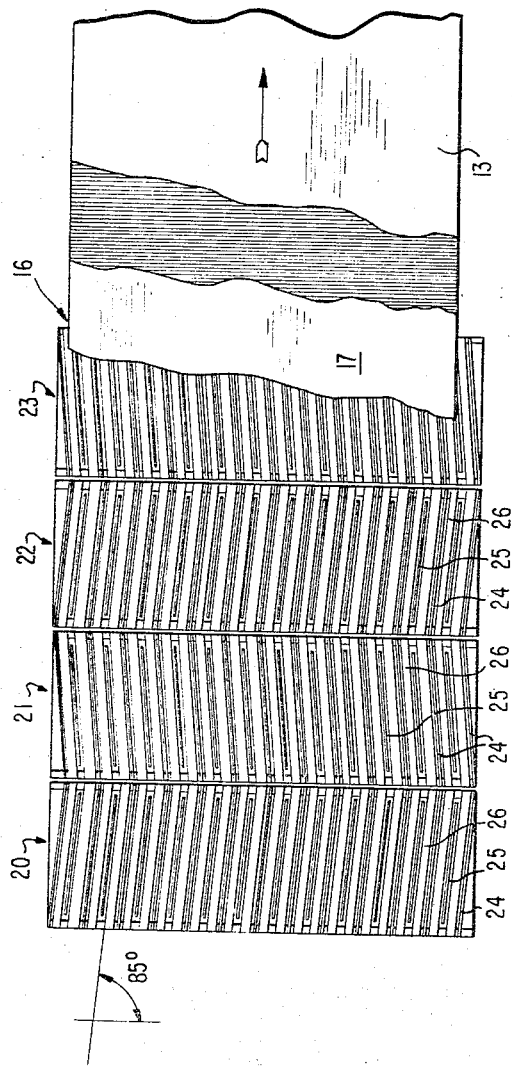
INVENTORS
JOHN W. DRENNING
RICHARD J. BRIDGES
LORENZ K. E. DUERR
BY Burns, Doane, Benedict,
    Swecker & Mathis
ATTORNEYS

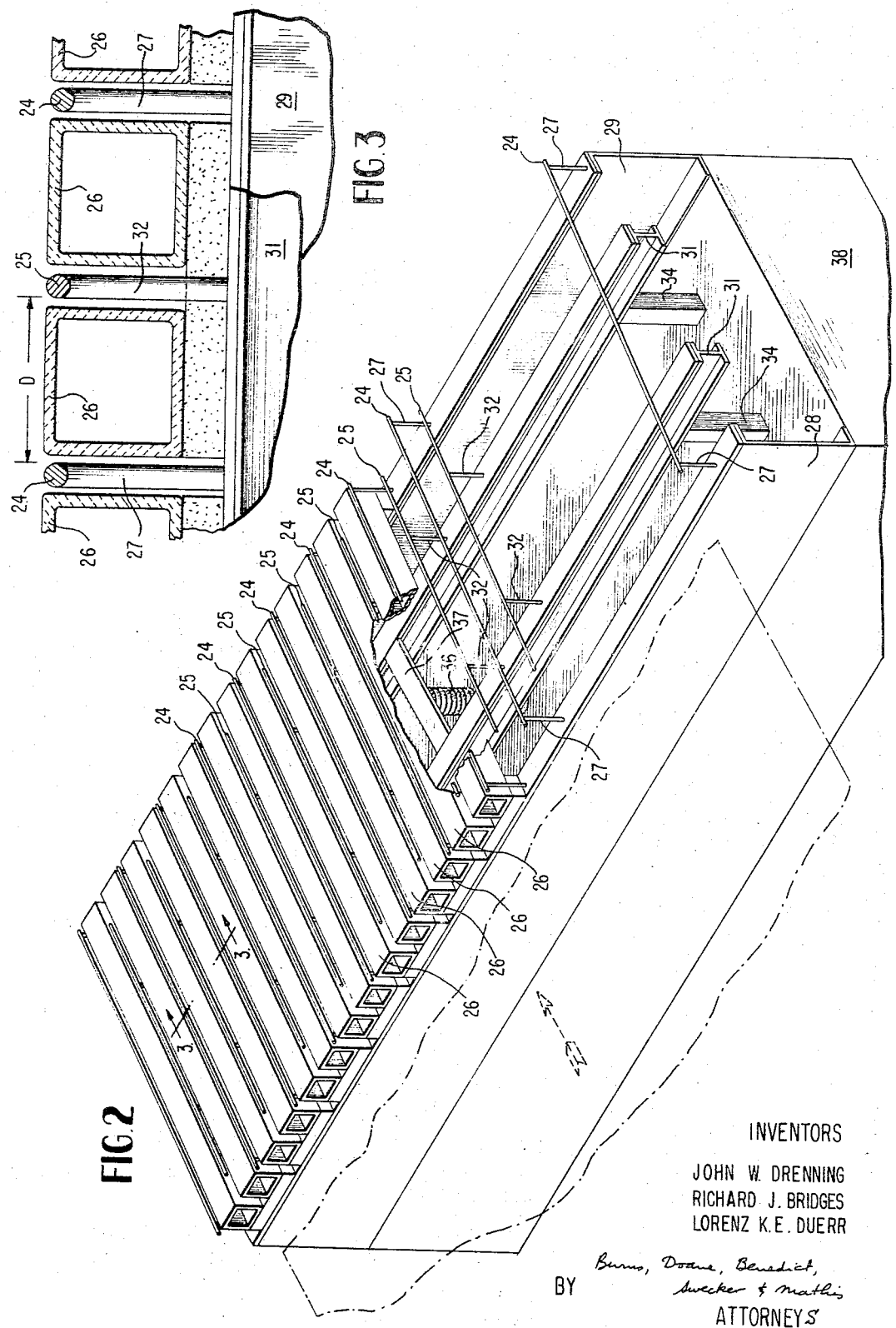

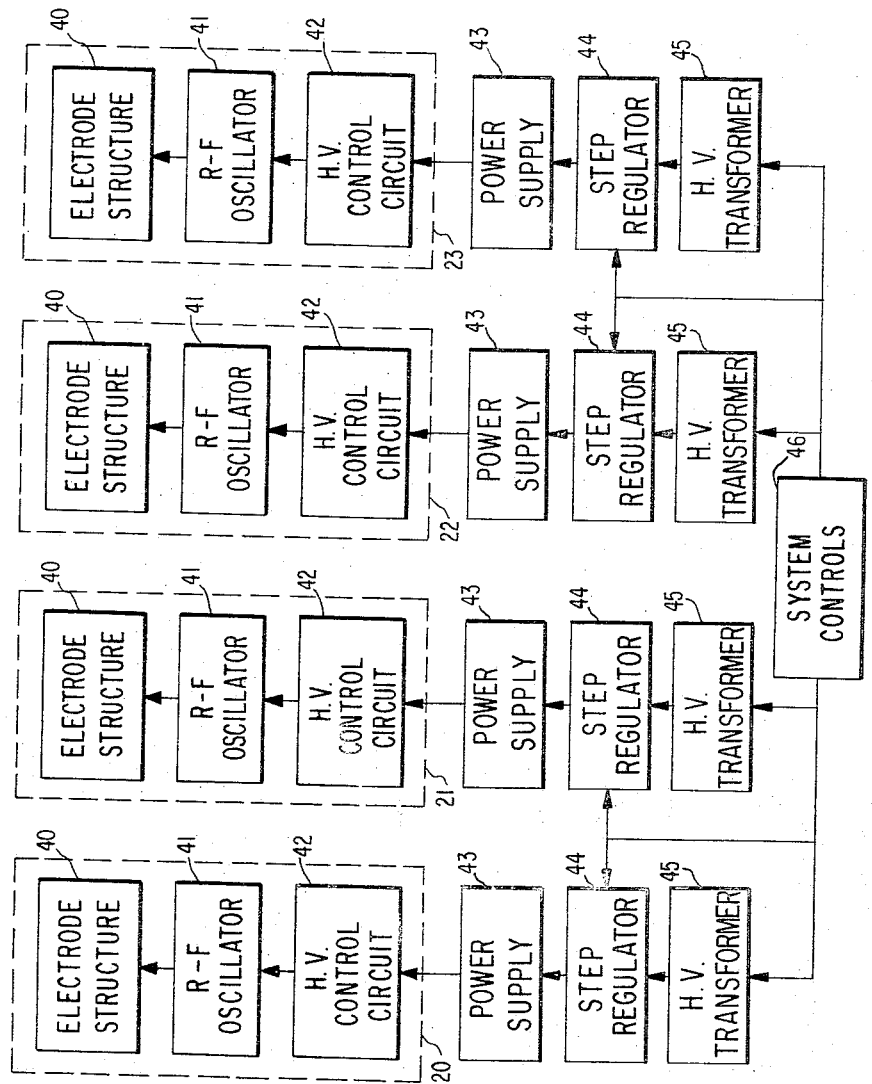

3,340,125
ADHESIVE BONDING METHOD AND APPARATUS

John W. Drenning and Richard J. Bridges, Baltimore, and Lorenz K. E. Duerr, Fulton, Md., assignors to Koppers Company, Inc., Pittsburgh, Pa., a corporation of Delaware
Filed Dec. 18, 1964, Ser. No. 419,485
15 Claims. (Cl. 156—274)

ABSTRACT OF THE DISCLOSURE

A doublebacking machine and method wherein dielectric heating of the glue line is controlled effected by applying high frequency potential between individual adjacent pairs of electrodes arranged at an angle somewhat less than 90° to the direction of paperboard travel. A potential gradient increasing in the direction of paperboard travel may be provided.

---

This invention relates to methods and apparatus for adhesively bonding laminated materials together and more particularly to techniques and manufacturing equipment for the production of corrugated paperboard.

It has long been conventional in the production of corrugated paperboard to pass the constituent materials through a so-called doublebacker machine wherein single faced corrugated paper carrying glue lines of a freshly applied adhesive composition on the exposed peaks of its corrugations is bonded to a facing sheet, the superposed sheets being subjected to heat and pressure in a heating section of the doublebacker to set the adhesive composition and to dry out moisture, producing a travelling sheet of corrugated paperboard. The adhesive compositions which are generally employed in the manufacture of corrugated paperboard take the form of starch or silicate suspensions which contain water as a carrier or softener. During the heating process the adhesive on the flutes of the corrugated paper undergoes a change from a viscous liquid to a semi-rigid solid as it hydrates and loses moisture content.

In heating partially completed paperboard to cure the adhesive, it has been customary to pass the paperboard into contact with one or more flat plates maintained at an elevated temperature by steam under pressure or by flaming jets. Naturally, a certain quantity of heat energy must be transferred from the heating section through the paperboard and into the adhesive composition to effect the cure of the adhesive. As efforts are made to increase the speed of paperboard production, it has been necessary, in order to transfer sufficient heat to the adhesive composition, to increase the total length of the heating section or to elevate the temperatures therein still further, or both.

This has led to undesired consequences. Increasing the total length of the heating section requires the paperboard manufacturing equipment to occupy a substantially larger area of the plant in which it is installed. The use of much higher temperatures in the heating section can also result in damage to the paperboard because of the excessive heat, with the result that a portion of the production may be lost and the manufacturing process shut down until the condition is corrected. In addition to this, the large mass of a lengthy heating section with heating plates therein represents a sizable heat reservoir, the temperature of which is difficult to control effectively, especially at varying rates of production.

It is therefore apparent that the application of precise temperature control, and the adaptation of applied temperatures to the dynamically changing requirements of the product, cannot be achieved precisely. In instances, it cannot be maintained within the range of conditions required to produce a commercially satisfactory paperboard. In the industry, a substantial amount of the paperboard produced develops warp along the length of the corrugations or transverse to the length of the produced web, sufficient to require its rejection. Usually, at considerable financial loss, the rejected material is returned to the manufacturer for repulping. Transverse warp of this nature is, we believe, largely due to conditions inherent and hitherto essentially unavoidable in the making of corrugated paperboard. The overall manufacturing process is initiated with three flat webs. The center web is passed through a corrugating machine to form the central element of the product. It is, however, impractical to corrugate flat stock satisfactorily as it is received in a roll from the manufacturer. In order to soften the stock sufficiently to permit its conversion into a corrugated shape, the center ply of the ultimate product must be to some extent hydrated or moistened to achieve sufficient flexibility for undergoing the corrugating operation. As the corrugated web passes off the corrugating roll, it is glued to a flat liner to form a single faced corrugated web. This web is used, substantially immediately or after brief passage on a conveyor, to form the composite product in the doublebacker where it is joined to the lower flat liner.

In conventional manufacturing operations, the lower web of the composite product is also received in the form of rolled stock from the paper manufacturer. If stock from the roll is introduced directly to the doublebacker without intermediate treatment, the lower ply of the product tends to develop bulges and other characterisics resulting in undesirable effects in the quality of the composite paperboard product. It is consequently the practice in the art the lower ply of the product from the roll in tension over a heated cylinder or arcuate surface which tends to smooth and flatten the web before it is plyed to the upper members in the doublebacker.

Thus, the doublebacking operation is inherently carried out to join a hydrated single faced corrugated web to a lower flat web which, to the extent it has been heated, is relatively dehydrated. Assuming that the original flat stock material rolls had substantially reached uniform humidification during storage, therefore, the manufacturing process inherently establishes a differential in their moisture contents before they are joined in the conventional doublebacking machine. This condition if sufficiently severe, tends to produce warping by dimensional changes of the web as the humidity content of its constituent plies equalizes to a steady state condition in subsequent storage. Indeed, warpage of this type may set in almost immediately after the finished product leaves the machine.

The inherent differential of moisture content just discussed is further aggravated in the conventional doublebacking operation where the lower ply is passed under pressure against an underlying hot flat plate or chamber. Where the thermal energy is passed to the glue lines by direct heat conduction through the lower flat web, its temperature rises very substantially with a tendency to further dry this web, which has already undergone loss of moisture in its earlier treatment. To the extent that such moisture loss occurs, it is preferentially absorbed by the cool portions of the overlying element and there is a relative enhancement of the moisture content of the intermediate and corrugated element. Undoubtedly this to some extent passes therethrough and tends to increase the hydration of the upper flat web.

It will thus be seen that procedures of the conventional manufacturing processes for corrugated paperboard inherently tend to establish the final bond of the glue between the corrugated liner and the lower web when the upper two members of the composite product have been materially increased in hydration, while the lower web has been materially dehydrated, relative even to the moisture content differential present when these components were introduced into the doublebacker.

The present invention does not supply the thermal energy to the glue by direct heat conduction through the lower web. On the contrary, means are provided for effecting dielectric heating of the glue material. Moreover, the development of higher thermal energy levels is substantially limited to the glue material itself, which has very substantial dielectric losses in comparison to the substantially negligible or marginal losses under induction developed by the paper stock. Consequently, in the practice of the present invention, the lower liner is not heated, and perhaps more importantly, is not preferentially heated with respect to the corrugated member and the upper liner. Consequently, practice of the present invention does not further dehydrate the lower liner to drive off moisture which may be collected in the two cooler components thereabove, but rather the lower liner remains generally in thermal equilibrium with the two upper elements. Consequently, when moisture is evaporated by the thermal energy applied to the glue material, the dehydrated lower liner may even preferentially absorb the available vapor and the tendency of the central corrugated member to accept a higher proportion of the vapor than the lower flat ply due to its relatively lower temperature level is substantially inhibited.

It will thus be seen that practice of the present invention not only avoids further decreasing the humidity level of the lower ply by direct heat conduction from an underlying plate, it establishes conditions under which due to the initial relatively lower moisture content of the lower web, the latter may preferentially hydrate from the evaporated moisture from the glue material as compared with the upper corrugated and flat web members. As a result, when the glue bond has finally cured in the environment established by the present invention, and the moisture content of the plural elements of the product has thereafter equalized, there is much less tendency for dimensional changes to eventuate and warping is materially decreased.

While the above discussion has referred to hydrated and water-dispersed glues which under the double backing process evaporate moisture, it will be understood that other types of adhesives may be employed. The use of chemically thermo-setting glue materials or adhesives does not, of course, materially inhibit the maintenance of high moisture differentials between the lower web and the overlying members in conventional practice. Thus, the use of dielectric heating as herein disclosed is directly applicable to the use of such materials in materially tending to an equalization of moisture content throughout the composite product at the time such materials are plyed with a final bond. Similarly, where liquid components other than water are used in part or exclusively in the adhesive composition, their vapor would tend more to absorption in the corrugated layer in conventional practice than it would the lower flat web under direct heat conduction from an external heat source. Consequently, the use of dielectric heating as herein disclosed is of high utility regardless of whether the adhesive composition incorporates only water as a liquid, or other liquids, or is liquid free.

Adhesive materials employed in the final step of manufacturing corrugated paperboard in the double backing machine are, for the purposes of the present invention, described as heat curable generically to refer to chemically thermo-setting bonding agents as well as adhesive compositions carrying liquid, such as the widely conventionally used water-starch adhesive composition.

It is accordingly the primary object of the present invention to manufacture warp resistent corrugated paperboard.

It is a further object of the invention to bond the lower ply of corrugated paperboard with the super-imposed elements of the product under conditions minimizing differentials in moisture content to promote the achievement of a flat warp-free product.

It is an object of this invention to provide an improved method for adhesively joining laminar materials such as corrugated paperboard and for uniformly heating the adhesive composition by which they are secured to maintain the rate at which liquid is removed and the adhesive composition cured at a maximum effective rate without the use of large thermal reservoirs.

A further object of this invention is to provide a method for adhesively bonding corrugated paperboard and similar materials together which may be carried out safely and effectively at high speeds such as 600 feet per minute or more with equipment which requires less floor area than has been necessary heretofore.

It is a further object of this invention to provide apparatus for the manufacture of corrugated paperboard and similar products which promotes improved and uniform adhesion between layers to be joined by a combination of simultaneously imposed effects including selective heating of the adhesive agent, efficient moisture removal, and a gentle brushing action which cooperate in a unique manner tending to promote uniformity of the finished product and to increase the speed at which the manufacturing operation may be carried out.

A still further object of this invention is the provision of an improved apparatus for the manufacture of adhesively joined products such as corrugated paperboard including a heating apparatus of modular construction having separate portions thereof which may be selectively inactivated, either separately or collectively, during manufacture of the product without damage thereto.

Yet another object of this invention is to provide apparatus for adhesively joining corrugated paperboard and similar products having a heating apparatus comprising modular components and means for selectively controlling the electrical field strength developed in each module during operation without interrupting the manufacturing process.

In carrying out the invention in one of its preferred forms, these and other objects are realized by a doublebacker machine which operates to join a single-faced corrugated paper web to a facing sheet after the application of a liquid-softened adhesive composition to the exposed flutes on the corrugations of the paper web. In a preferred form of the invention the partially completed corrugated paperboard with the still moist adhesive between the corrugations and the facing sheet is guided into and through a heating section wherein a plenum or air chamber overlies a plurality of modular dielectric heating assemblies. Each of the dielectric assemblies, which are spaced lengthwise in the direction of travel of the partially completed corrugated paperboard, comprises a plurality of mutually parallel electrodes preferably arranged in the general direction of travel of the web, but at a slightly diverging angle thereto. Preferably, the parallel electrodes of each successive dielectric heater are arranged with equal and opposite angularities with respect to the direction of travel of the web. Between each adjacent pair of electrodes in each of dielectric heaters are supported dielectric spacers preferably with air gaps between the spacers and the electrodes such that the entire upper surface of the dielectric heating assembly constitutes a discontinuous plane with voids between supporting surfaces for the web which travels over them.

Alternating potentials of high frequency are applied across adjacent pairs of the electrodes in each dielectric heating assembly to establish an electrostatic field between electrodes. The electrostatic field creates a fringe field in such a manner that the preferred potential gradient between electrodes follows a line which extends up into the corrugated paperboard and along the glue lines between the flutes of the corrugation and the facing sheet. During the passage of the corrugated paperboard through the heating section a drying current of air is supplied to the interior of the plenum above the dielectric heaters under sufficient pressure to urge the partially completed paperboard against the underlying electrode structure. Thus, as the paperboard travels over the dielectric heaters the combination of the gentle and uniform air pressure from above with the discontinuous supporting surfaces beneath exerts a brushing influence on the lowermost facing sheet of the paperboard during the heat curing of the adhesive composition. In addition, the current of air which escapes from the plenum around the sides of the paperboard carries off vaporized components of the adhesive composition and promotes an especially rapid drying process. Simultaneously with these effects, the angularity of the parallel electrodes in each dielectric heater results in the creation of electrostatic fields which sweep along the glue lines, selectively and sequentially heating separate portions of each glue line.

It is contemplated that in some cases the softening liquid contained in the moist adhesive composition may have a high loss factor and that as the drying process is carried out the loss factor of the adhesive composition as a whole will be reduced. To compensate for this reduction in the dielectric loss factor of the adhesive composition, the successive dielectric heaters spaced along the path of travel of the corrugated paperboard may be supplied with potential gradients of increasing intensity. The potential gradient in the first dielectric heating section is preferably set at a level which will promote a maximum drying rate of the adhesive composition without exceeding safe limits. The potential gradient established by a successive dielectric heating section may be increased still further, without exceeding safe limits, because of the lower dielectric loss factor in the partially dried adhesive passing through successive portions of the heating section.

Although the scope of this invention is not to be limited except by a fair interpretation of the claims appended hereto, further details of the invention as well as additional objects and advantages will be more clearly understood in connection with the following more detailed description taken together with the accompanying drawings wherein:

FIGURE 1 is an isometric view, partially cut away, showing a double backing machine for the manufacture of corrugated paperboard constructed in accordance with the principles of this invention;

FIGURE 2 is an isometric view, partially cut away, illustrating the construction of one of the dielectric heaters shown in FIGURE 1;

FIGURE 3 is a cross-sectional view through a portion of one of the dielectric heaters taken on lines 3—3 of FIGURE 2;

FIGURE 4 is a plan view of the several dielectric heaters shown in FIGURE 1; and FIGURE 5 is a block diagram of the heater control circuit.

This invention is shown in FIGURE 1 embodied in a doublebacking machine wherein a single-faced corrugated web 10 is fed into the entrance end of the machine, the exposed flutes of the corrugations being coated with an adhesive composition 11. The adhesive composition 11, preferably a starch glue, is transferred to the exposed flutes in a viscous condition with a high moisture content by passing the web 10 over an applicator roller 12 partially immersed in the adhesive composition. A doctor blade or coacting roller, not shown in the drawings, is normally abutted against roller 12 to control the amount of glue applied. In this manner each crest of a flute is coated with a glue line, the flutes and glue lines extending transverse to the direction of travel of the single-faced web. After the application of the adhesive composition the web 10 is brought into contact with a travelling facing sheet 13 which runs over a guide roll 14 located at the entrance end of a heating section 15. Both the water-starch glue, when used, and the pretreatment, particularly of the corrugated web, together with the same type of glue, if used, in the initial bonding of the upper web, enhance the moisture content of the single faced web. In the heating section the partially completed corrugated paperboard thus formed is treated by heating the adhesive in a manner to be described to aid in setting the adhesive and drying out the material. A continuous length of corrugated paperboard is delivered from the heating section at 16 for further operations to be performed thereon such as slitting, scoring, punching, folding or the like.

In securing an effective bond between the separate components of the partially completely paperboard 17, the adhesively coated flutes of the corrugated sheet should be pressed firmly against the lower liner while the latter is held flat. The lower liner should resist the pressure of the flutes with a uniform pressure along the glue lines which constitute the only areas of contact between the lower liner and the corrugations. Simultaneously, heat energy should be supplied as quickly as possible to the glue line, to heat it to a temperature at which the adhesive composition hydrates and the viscosity of the glue line greatly increases. Continued heating of the adhesive composition drives excess moisture therefrom to cause a further increase in its viscosity and strength. A greater quantity of heat energy is required to drive off the excess moisture than is necessary to effect hydration of the adhesive.

In the practice of this invention the bonding operation is effected in the heating section 15 through the use of dielectric heating means capable of transferring thermal energy to the glue lines at high rates without the use of massive heated thermal reservoirs. In FIGURE 1 the dielectric heating means are shown to include four separate dielectric heaters 20, 21, 22 and 23 spaced horizontally in the direction of travel of the partially completed paperboard, although a greater or lesser number of heaters may obviously be employed in the practice of the invention.

A more detailed view of one of the dielectric heaters showing especially the construction of its electrode assembly is shown in FIGURE 2. Here the electrode assembly selected for illustration may be seen to include a plurality of parallel ground electrodes 24 and a set of parallel high potential electrodes 25 interspersed therebetween. A plurality of ceramic spacers 26 are arranged within and part of the electrode assembly. In the illustrated example the spacers are hollow and rectangular, although they might have other configurations such as T-shaped and solid. One spacer is located between each adjacent pair of electrodes, preferably with small air gaps between the spacers and the electrodes. The ground electrodes 24 are connected by conducting rods 27 at their opposite ends to ground busses 28 and 29, preferably formed of aluminum. The high potential electrodes 25, shielded at their ends by the greater length of the ground electrodes 24, are supported on high potential busses 31, also formed preferably of aluminum, by conducting rods 32 connected at two separate points spaced from their ends by a distance about one fourth the length of the high potential electrodes. The high potential busses 31, which rest on stand-off insulators 34, are supplied with radio frequency energy through a hollow feed-through bushing 36 and connecting strap 37 from a radio frequency generator located within the generator housing 38 at the base of the assembly. The symmetrical connection of the high potential electrodes 25 at two spaced-apart points is electrically equivalent to connecting the center of each electrode to the radio frequency generator, but results in superior mechanical characteristics and minimizes uneven potential variations along the length of the electrodes resulting from unequal distances.

In the electrode assemblies, the top surfaces of the electrodes 24 and 25 and of the dielectric spacers 26 all lie in the same plane to provide a discontinuous plane surface upon which the partially completed paperboard rests. This is best seen in FIGURE 3, a cross-sectional view through a portion of the electrode structure. The perpendicular distance D between the high potential electrodes 25 and the interleaved ground electrodes 24 adjacent the top surface of the electrode assembly is of great importance. This separation distance and the uniformity of the separation is important to the shape of the electric and magnetic fields between the electrodes through which the corrugated board passes. Since the dielectric loss factor of the adhesive composition is much greater than that of any other component of the corrugated paperboard it absorbs the majority of the high frequency energy directed through and along the paperboard. The energy absorbed is a function of the loss factor, the frequency of the field, and the square of the potential gradient across the material in the field.

As can be seen with greater clarity in connection with the plan view of the electrode structure shown in FIGURE 4, each electrode is oriented generally in the direction of travel of the partially completed paperboard but at a slightly divergent angle thereto. In the embodiment shown, each electrode has an angle of 85° with respect to the glue lines of the corrugated board. If this angle were zero degrees, i.e., if the electrodes were arranged parallel to the glue lines, the potential gradient within each glue line would be smaller and less radio frequency power would be absorbed by the glue line. When the electrodes are arranged parallel to the glue lines, the heating effect does develop a bond which is satisfactory for many purposes, although it may be necessary to elongate the heating section or to slow the speed of the web through the heating section to produce a completely satisfactory product. On the other hand, the maximum potential gradient for a given electrode potential would be established in the glue line if the angularity of the electrode with respect to the glue lines were 90°. However, with an angularity of 90° the adhesive immediately above each electrode would experience a very weak field and would absorb very little radio frequency power. By inclining the electrodes at an angle somewhat less than 90° with respect to the glue lines, every part of each glue line travels through the high strength field established between the electrodes and over the ceramic spacers. Consequently, when the corrugated board leaves the heating section each incremental part of the glue line will have experienced identical fields thereby contributing greatly to the uniformity, evenness and high quality of the finished product. Moreover, a continuous bond is difficult to achieve where the electrodes extend parallel to the direction of travel of the web, as such construction may not provide continuous physical support at all points beneath the web, resulting in bond weakness in unsupported areas.

The dielectric heater, it can be seen, is fabricated in modular subassemblies. Each module of the dielectric heater is arranged in the preferred embodiment illustrated such that the angularity of the electrodes of adjacent modules is alternated with respect to the direction of travel of the partially completed corrugated paperboard. This results in a herringbone pattern, which causes the resultant frictional force in the width direction of the travelling corrugated paperboard to be essentially zero. This minimizes the tendency of the lower liner to track toward one side or the other because of the sliding contact between the liner and the electrode structure. It also contributes further to the uniformity of the finished product.

As seen in FIGURE 1 the heating section 15 of the doublebacking machine illustrated is provided with an air chamber 40 defining a plenum overlying the dielectric heaters 20, 21, 22 and 23 on the opposite side of the partially completed corrugated paperboard 17. The air chamber in this example includes laterally extended aprons 41. Those portions of the air chamber in proximity to the dielectric heaters should be fabricated from a material which has a low dielectric loss factor and effective track resistance. A current of air under a modest pressure, preferably about four inches of water, is supplied to the interior of the air chamber as, for example, by an impeller 42. The current of air escapes via air gaps 43 of controlled dimension between the plenum and the surface of the moving corrugated board.

The pressurized air within the plenum contributes substantially to curbing any tendency of the paperboard to warp by creating a gentle uniform pressure over the entire upper surface of the corrugated board urging it into firmly supported contact with the underlying electrode structures. Consequently, not only is the board uniformly leveled throughout that portion within the heating section, but the still-moist lower glue lines are also pressed as closely as possible to the electrode structures from which they derive curing energy. In addition, the current of air supplied to the plenum also removes the moisture-laden air from the vicinity of the moving partially completed corrugated paperboard 17 through the air gaps 43 adjacent the surface of the paperboard.

Removal of moisture also eliminates the possibility of condensation occurring over and around the electrode structure. Any condensation which occurs between the electrodes, of course, could contribute to an arc between electrodes. Removal of the moisture content minimizes the possibility of an arc-over and permits higher potentials to be applied to the electrodes to reduce the total heating time of the adhesive. Any excessive moisture which would otherwise be permitted to remain would also consume and waste radio frequency energy and would thus lower the efficiency of the dielectric heaters. The rapid removal of the moisture-laden air thus promotes a high efficiency in the operation of the heating section. In addition, the efficiency of the heating section is promoted because the dissipation factor of air is low and because the pressurized plenum requires no solid pressure-applying members to be in contact with the upper surface of the corrugated board in positions where they would divert portions of the radio frequency energy from the glue lines.

In bonding with some adhesive compositions currently in widespread use, most of the dielectric loss factor of the adhesive composition may be contributed by the moisture content within the composition. As the moisture content of such an adhesive composition decreases, therefore, the dielectric loss factor of the adhesive composition as a whole also decreases. The modular construction of the dielectric heaters permits the use of increasing potential gradients in successive portions of the heating section to compensate for a changing loss factor of the adhesive composition during its progress through the heating section. Of course, if an adhesive composition is employed which has a high loss factor whether cured or uncured, it may not be desirable to increase successive potential gradients. The machine shown can accommodate either kind of adhesive composition effectively.

In the operation of a machine of the type described herein wherein the adhesive composition employed for bonding the single-faced corrugated paper to a facing sheet, is for example, a typical starch glue softened by water, it has been found convenient to employ potential gradients in the heaters 22 and 23 approximately 1.5 times as great as those used in heaters 20 and 21. The power absorbed by the glue line is a function of the squared potential gradient. If substantially the maximum potential which the glue line can effectively absorb without adverse consequences is applied to the glue line, it will absorb the maximum amount of power. Since only a fixed amount of power is required for a given process speed, the power will be supplied in a minimum electrode length with the maximum potential gradient applied to the glue line.

The potential gradient can be increased in successive portions of the heating section either by reducing the perpendicular distance between electrodes or by increasing the potential between electrodes in the successive sections. Thus, latter modules may be given a closer spacing and/or greater radio-frequency potential between electrodes as compared to the preceding module or modules. In the use of the embodiment of the invention shown, however, similar electrode spacings are employed in all four of the dielectric heaters. In curing starch glue a potential gradient of approximately 1.9 peak kilovolts per inch between electrodes is established in the first and second dielectric heaters 20 and 21. This gradient approaches the maximum which may be effectively employed in curing a typical water-softened starch glue used in the production of corrugated paperboard. In the third and fourth dielectric heaters 22 and 23 the potential gradient is increased to 2.88 peak kilovolts per inch in compensation for the decreasing dielectric loss factor of the partially gelatinized adhesive composition.

A heater control system by which selective and adjustable potential gradients may be applied to the partially completed corrugated paperboard is illustrated diagrammatically in FIGURE 5. Each of the modular dielectric heaters 20, 21, 22 and 23 is seen to comprise an electrode structure 40, as previously described, fed with high frequency signals from a radio frequency oscillator 41 which can be isolated in each case by a separate high voltage control circuit 42. Since each dielectric heater has a separate step regulator 44, the potential gradient across the electrodes in each electrode structure may be separately controlled. As seen in this diagram, modules 20 and 21 receive their power from similar power supplies 43 and additional power supplies feed modules 22 and 23. All power supplies 43 are energized through a step regulator 44 by similar high voltage transformers 45 controlled by system controls 46 which also control the step regulators 44. The system controls 46 are preferably integrated with the overall control system for the corrugated paperboard manufacturing machinery. With a modular construction of the dielectric heaters as shown and the use of such potential gradients which increase in the direction of travel of the web, it is possible to process a typical doublefaced corrugated paperboard bonded with starch glue at rates up to at least 600 feet per minute and to effect the curing of the adhesive agent through the use of a heating section of only about 12 feet in length.

The modular construction of the heating section with separate generators for each of the dielectric heaters, in addition to providing a highly versatile and selective control of heating factors, also reduces the down time of the machine in the event of a failure in one of the radio frequency generators. Although the production speed of the equipment would have to be reduced in the event of a failure in any one of the radio frequency generators, it is possible in such an eventuality, to disconnect all interface connections in the affected module and repair it while the remaining modules are still operating.

As previously mentioned, the support surfaces of the electrode assemblies are constructed in such a way as to cause air spaces to exist between the sides of each electrode and the adjacent ceramic supports. These greatly reduce the build-up of paper fiber particles, adhesive particles, and foreign contaminants which might otherwise accumulate between the electrodes and permit the escape of residual moisture from the lower surface of the corrugated paperboard. The clean surfaces between electrodes and ceramic insulators also permits an increased design potential to be placed on the electrodes, because the flash-over potential is inversely proportional to the cleanliness of the surfaces between the electrodes. The flash-over potential is also a function of the surface distance between the high potential electrodes and the ground electrodes. The air spaces between electrodes and ceramic spacers greatly increase that distance. The increase of the design potential which may be placed upon the electrodes in turn reduces the heating time of the adhesive composition.

Many variations in the arrangement and construction of the modular dielectric heating assemblies are, of course, possible. For example, instead of the use of alternate angularities creating a herringbone pattern in the electrode structures as described in connection with FIGURE 4, the modules could be constructed such that the angularity and orientation of the first two modules is similar and such that the angularity of the electrodes of the third and fourth modules is equal and opposite to that of the first two modules resulting in a V-shaped pattern which would have compensating surface frictional effects similar to those of the herringbone pattern. To minimize coupling between adjacent modules, the electrode structures can also be arranged such that the endmost portions of electrodes in adjacent modules are laterally offset with respect to each other.

In addition to these variations and others indicated above, certain variations and modifications of the invention will doubtless occur to those skilled in the art to which this invention pertains. It should be understood that the invention produces a corrugated paperboard product without increasing the preexisting moisture content differential between the lower facing sheet and the single faced web, thus reducing the tendency to warp. This is achieved by the use of dielectric heating, rather than by direct heat transfer through the lower web. Moisture evaporated from the adhesive material, it is believed, tends to preferentially absorb in the lower facing sheet, whereby the bonding process actually tend to equalize the moisture contents.

Practice of the invention is therefore not limited to the illustrative forms shown and described and that the appended claims are intended to cover all such variations and modifications as come within the true spirit and scope of this invention in its broader aspects.

What is claimed is:

1. A doublebacker machine comprising:
 a web heating section;
 means for guiding a single faced corrugated paper web to pass through said heating section;
 means for applying a liquid-softened adhesive composition to the exposed peaks of the corrugations of such web when travelling toward said heating section;
 means for guiding a facing sheet into contact with said peaks when travelling to said heating section to form partially completed corrugated paperboard;
 a dielectric heating electrode structure presenting a discontinuous plane surface and including a plurality of parallel electrodes mounted in said heating section adjacent the aforesaid facing sheet of said partially completed corrugated paperboard at an angle somewhat less than 90° with respect to the direction of travel of said paperboard;
 means for supplying high frequency potentials between pairs of said electrodes to heat and cure the dielectric composition applied to the aforesaid corrugations;
 a plenum adjacent the opposite facing of said partially completed corrugated paperboard; and
 means for supplying a drying current of air to the interior of said plenum under sufficient pressure to urge said partially completed paperboard against said electrode structure and to carry off liquid components of said adhesive composition, whereby the discontinuous surface of said electrode structure exerts a brushing influence on the aforesaid facing sheet during the curing of the adhesive composition.

2. A doublebacker machine comprising:
 a web heating section;
 means for guiding a single faced corrugated paper web to pass through said heating section in a direction transverse to the corrugations of such paper web;

means for applying an adhesive composition to the exposed peaks of the corrugations of such web when travelling toward said heating section;

means for guiding a facing sheet into contact with said peaks when travelling to said heating section to form partially completed corrugated paperboard;

an electrode structure including a plurality of parallel electrodes mounted in said heating section adjacent the aforesaid facing sheet of said partially completed corrugated paperboard at an angle somewhat less than 90° with respect to the orientation of the aforesaid corrugations;

said electrode structure including, in addition, dielectric spacing means disposed between adjacent pairs of said electrodes, said electrode structure presenting a discontinuous plane surface adjacent the aforesaid facing sheet;

means for supplying high frequency potentials across adjacent pairs of said electrodes to heat and cure the dielectric composition applied to the aforesaid corrugations;

a plenum adjacent the opposite facing of said partially completed corrugated paperboard; and means for supplying a drying current of air to the interior of said plenum under sufficient pressure to urge said partially completed paperboard against said electrode structure and to carry off vaporized components of said adhesive composition, whereby the discontinuous surface of said electrode structure exerts a brushing influence on the aforesaid facing sheet during the curing of the adhesive composition and sweeps electrostatic fields along the lines of adhesive on the corrugations of the paperboard.

3. A doublebacker machine comprising:

a web heating section;

means for guiding a single faced corrugated paper web to pass through said heating section in a direction transverse to the corrugations of such paper web;

means for applying a liquid-softened adhesive composition to the exposed peaks of the corrugations of such web while travelling toward said heating section;

means for guiding a facing sheet into contact with said peaks while travelling to said heating section to form partially completed corrugated paperboard;

a plurality of dielectric heaters spaced along the direction of travel of said partially completed corrugated paperboard each including an electrode structure having a plurality of elongated mutually parallel electrodes mounted in said heating section adjacent the aforesaid facing sheet of said partially completed corrugated paperboard; and means for supplying selectively controllable high frequency potentials across adjacent pairs of said electrodes in each of said dielectric heaters to heat and cure the adhesive composition applied to the aforesaid corrugations.

4. A doublebacker machine comprising:

a web heating section;

means for guiding a single faced corrugated paper web to pass through said heating section in a direction transverse to the corrugations of such paper web;

means for applying a liquid-softened adhesive composition to the exposed peaks of the corrugations of such web while travelling toward said heating section;

means for guiding a facing sheet into contact with said peaks while travelling to said heating section to form partially completed corrugated paperboard;

a plurality of dielectric heaters spaced along the direction of travel of said partially completed corrugated paperboard each including an electrode structure having a plurality of elongated mutually parallel electrodes mounted in said heating section adjacent the aforesaid facing sheet of said partially completed corrugated paperboard, said electrodes being substantially parallel to the direction of travel of said paperboard; and means for supplying high frequency potentials across adjacent pairs of said electrodes in each of said dielectric heaters at potential gradients which increase in the direction of travel of said paperboard to heat and cure the adhesive composition applied to the aforesaid corrugations.

5. A doublebacker machine comprising:

a web heating section;

means for guiding a single faced corrugated paper web to pass through said heating section in a direction transverse to the corrugations of such paper web;

means for applying a liquid-softened adhesive composition to the exposed peaks of the corrugations of such web while travelling toward said heating section;

means for guiding a facing sheet into contact with said peaks while travelling to said heating section to form partially completed corrugated paperboard;

a plurality of dielectric heaters spaced along the direction of travel of said partially completed corrugated paperboard each including an electrode structure having a plurality of elongated mutually parallel electrodes mounted in said heating section adjacent the aforesaid facing sheet of said partially completed corrugated paperboard, said electrode structure presenting a discontinuous plane surface contiguous to the aforesaid facing sheet with air spaces therein;

means for supplying selectively adjustable high frequency potentials across adjacent pairs of said electrodes in each of said dielectric heaters independently to heat and cure the adhesive composition applied to the aforesaid corrugations;

means for urging said partially completed paperboard against said electrode structure, whereby the discontinuous surface of said electrode structures exert alternate brushing influences on the aforesaid facing sheet during the curing of the adhesive composition.

6. A doublebacker machine comprising:

a web heating section;

means for guiding a single faced corrugated paper web to pass through said heating section in a direction transverse to the corrugations of such paper web;

means for applying a liquid-softened adhesive composition to the exposed peaks of the corrugations of such web while travelling toward said heating section;

means for guiding a facing sheet into contact with said peaks while travelling to said heating section to form partially completed corrugated paperboard;

a plurality of dielectric heaters spaced along the direction of travel of said partially completed corrugated paperboard each including an electrode structure having a plurality of elongated mutually parallel electrodes mounted substantially parallel to the direction of travel of said paperboard in said heating section adjacent the aforesaid facing sheet of said partially completed corrugated paperboard, said electrode structure presenting a discontinuous plane surface contiguous to the aforesaid facing sheet with air spaces therein;

means for supplying high frequency potentials across adjacent pairs of said electrodes in each of said dielectric heaters at potential gradients which increase in the direction of travel of said paperboard to heat and cure the adhesive composition applied to the aforesaid corrugations; and means for urging said partially completed paperboard against said electrode structure, whereby the discontinuous surface of said electrode structures exert alternate brushing influences on the aforesaid facing sheet during the curing of the adhesive composition.

7. A doublebacker machine comprising:

a web heating section;

means for guiding a single faced corrugated paper web to pass through said heating section in a direction transverse to the corrugations of such paper web;

means for applying a liquid-softened adhesive composition to the exposed peaks of the corrugations of such web while travelling toward said heating section;

means for guiding a facing sheet into contact with said peaks while travelling to said heating section to form partially completed corrugated paperboard;

a plurality of dielectric heaters spaced along the direction of travel of said partially completed corrugated paperboard each including an electrode structure having a plurality of elongated mutually parallel electrodes mounted in said heating section adjacent the aforesaid facing sheet of said partially completed corrugated paperboard and arranged at alternate diverging angles with respect to the direction of travel thereof, said electrode structure also including elongated dielectric spacers disposed between adjacent pairs of said electrodes to create fringe fields through which said paperboard is guided, said electrode structure presenting a discontinuous plane surface contiguous to the aforesaid facing sheet with air spaces therein;

means for supplying selectively controllable high frequency potentials across adjacent pairs of said electrodes in each of said dielectric heaters independently to heat and cure the adhesive composition applied to the aforesaid corrugations; and means for urging said partially completed paperboard against said electrode structure, whereby the discontinuous surface of said electrode structures exert alternate brushing influences on the aforesaid facing sheet during the curing of the adhesive composition and electrostatic fields are swept along the lines of adhesive on the corrugations.

8. A doublebacker machine comprising:

a web heating section;

means for guiding a single faced corrugated paper web to pass through said heating section in a direction transverse to the corrugations of such paper web;

means for applying a liquid-softened adhesive composition to the exposed peaks of the corrugations of such web while travelling toward said heating section;

means for guiding a facing sheet into contact with said peaks while travelling to said heating section to form partially completed corrugated paperboard;

a plurality of dielectric heaters spaced along the direction of travel of said partially completed corrugated paperboard each including an electrode structure having a plurality of elongated mutually parallel electrodes mounted in said heating section adjacent the aforesaid facing sheet of said partially completed corrugated paperboard and arranged at alternate diverging angles with respect to the direction of travel thereof, said electrode structure also including elongated dielectric spacers disposed between adjacent pairs of said electrodes to create fringe fields through which said paperboard is guided, said electrode structure presenting a discontinuous plane surface contiguous to the aforesaid facing sheet with air spaces therein;

means for supplying high frequency potentials across adjacent pairs of said electrodes in each of said dielectric heaters at potential gradients which increase in the direction of travel of said paperboard to heat and cure the adhesive composition applied to the aforesaid corrugations; and means for urging said partially completed paperboard against said electrode structure, whereby the discontinuous surface of said electrode structures exert alternate brushing influences on the aforesaid facing sheet during the curing of the adhesive composition and electrostatic fields are swept along the lines of adhesive on the corrugations while permitting the escape of residual vapors and dislocated particles through the air spaces in said electrode structure.

9. A doublebacker machine comprising:

a web heating section;

means for guiding a single faced corrugated paper web to pass through said heating section in a direction transverse to the corrugations of such paper web;

means for applying a liquid-softened adhesive composition to the exposed peaks of the corrugations of such web while travelling toward said heating section;

means for guiding a facing sheet into contact with said peaks while travelling to said heating section to form partially completed corrugated paperboard;

a plurality of dielectric heaters spaced along the direction of travel of said partially completed corrugated paperboard each including an electrode structure having a plurality of elongated mutually parallel electrodes mounted in said heating section adjacent the aforesaid facing sheet of said partially completed corrugated paperboard, said electrode structure also including elongated dielectric spacers disposed between adjacent pairs of said electrodes to create fringe fields through which said paperboard is guided, said electrode structure presenting a discontinuous plane surface contiguous to the aforesaid facing sheet with air spaces therein;

means for supplying selectively controllable high frequency potentials across adjacent pair of said electrodes in each of said dielectric heaters independently to heat and cure the adhesive composition applied to the aforesaid corrugations;

a plenum adjacent the opposite facing of said partially completed corrugated paperboard with air passages around peripheral portions thereof adjacent said paperboard; and means for supplying a drying current of air to the interior of said plenum under sufficient pressure to urge said partially completed paperboard against said electrode structure and to carry off vaporized components of said adhesive composition through said air passages, whereby the discontinuous surface of said electrode structures exert alternate brushing influences on the aforesaid facing sheet during the curing of the adhesive composition.

10. A doublebacker machine comprising:

a web heating section;

means for guiding a single faced corrugated paper web to pass through said heating section in a direction transverse to the corrugations of such paper web;

means for applying a liquid-softened adhesive composition to the exposed peaks of the corrugations of such web while travelling toward said heating section;

means for guiding a facing sheet into contact with said peaks while travelling to said heating section to form partially completed corrugated paperboard;

a plurality of dielectric heaters spaced along the direction of travel of said partially completed corrugated paperboard each including an electrode structure having a plurality of elongated mutually parallel electrodes mounted in said heating section adjacent the aforesaid facing sheet of said partially completed corrugated paperboard, said electrode structure also including elongated dielectric spacers disposed between adjacent pairs of said electrodes to create fringe fields through which said paperboard is guided, said electrode structure presenting a discontinuous plane surface contiguous to the aforesaid facing sheet with air spaces therein;

means for supplying selectively controllable high frequency potentials across adjacent pairs of said electrodes in each of said dielectric heaters at potential gradients which increase in the direction of travel of said paperboard to heat and cure the adhesive composition applied to the aforesaid corrugations;

a plenum adjacent the opposite facing of said partially completed corrugated paperboard with air passages around peripheral portions thereof adjacent said paperboard; and means for supplying a drying current of air to the interior of said plenum under sufficient pressure to urge said partially completed paperboard against said electrode structure and to carry off vaporized components of said adhesive composition through said air passages, whereby the discontinuous surface of said electrode structures exert alternate brushing influences on the aforesaid facing sheet during the curing of the adhesive composition.

11. A doublebacker machine comprising:

a web heating section;

means for guiding a single faced corrugated paper web to pass through said heating section in a direction transverse to the corrugations of such paper web;

means for applying a liquid-softened adhesive composition to the exposed peaks of the corrugations of such web while travelling toward said heating section;

means for guiding a facing sheet into contact with said peaks while travelling to said heating section to form partially completed corrugated paperboard;

a plurality of dielectric heaters spaced along the direction of travel of said partially completed corrugated paperboard each including an electrode structure having a plurality of elongated mutually parallel electrodes mounted in said heating section adjacent the aforesaid facing sheet of said partially completed corrugated paperboard and arranged at alternate diverging angles with respect to the direction of travel thereof, said electrode structure presenting a discontinuous plane surface contiguous to the aforesaid facing sheet with air spaces therein;

means for supplying selectively controllable high frequency potentials across adjacent pairs of said electrodes in each of said dielectric heaters independently to heat and cure the adhesive composition applied to the aforesaid corrugations;

a plenum adjacent the opposite facing of said partially completed corrugated paperboard with air passages around peripheral portions thereof adjacent said paperboard; and means for supplying a drying current of air to the interior of said plenum under sufficient pressure to urge said partially completed paperboard against said electrode structure and to carry off vaporized components of said adhesive composition through said air passages, whereby the discontinuous surface of said electrode structures exert alternate brushing influences on the aforesaid facing sheet during the curing of the adhesive composition and electrostatic fields are swept along the lines of adhesive on the corrugations.

12. A doublebacker machine comprising:

a web heating section;

means for guiding a single faced corrugated paper web to pass through said heating section in a direction transverse to the corrugations of such paper web;

means for applying a liquid-softened adhesive composition to the exposed peaks of the corrugations of such web while travelling toward said heating section;

means for guiding a facing sheet into contact with said peaks while travelling to said heating section to form partially completed corrugated paperboard;

a plurality of dielectric heaters spaced along the direction of travel of said partially completed corrugated paperboard, each heater including an electrode structure having a plurality of elongated mutually parallel electrodes mounted in said heating section adjacent the aforesaid facing sheet of said partially completed corrugated paperboard, the electrodes of said heaters being arranged respectively at alternate diverging angles with respect to the direction of travel thereof, said electrode structures also having elongated dielectric spacers disposed between adjacent pairs of said electrodes to create fringe fields through which said paperboard is guided, said electrode structure presenting a discontinuous plane surface contiguous to the aforesaid facing sheet with air spaces therein;

means for supplying selectively controllable high frequency potentials across adjacent pairs of said electrodes in each of said dielectric heaters independently to heat and cure the adhesive composition applied to the aforesaid corrugations;

a plenum adjacent the opposite facing of said partially completed corrugated paperboard with air passages around peripheral portions thereof adjacent said paperboard; and means for supplying a drying current of air to the interior of said plenum under sufficient pressure to urge said partially completed paperboard against said electrode structure and to carry off vaporized components of said adhesive composition through said air passages, whereby the discontinuous surface of said electrode structures exert alternate brushing influences on the aforesaid facing sheet during the curing of the adhesive composition.

13. A doublebacker machine comprising:

a web heating section;

means for guiding a single faced corrugated paper web having a relatively enhanced moisture content to pass through said heating section in a direction transverse to the corrugations of such paper web;

means for applying a heat-curable adhesive composition to the exposed peaks of the corrugations of such web while travelling towards said heating section;

means for guiding a facing sheet having a relatively decreased moisture content into contact with said peaks while travelling to said heating section to form a partially complete corrugated paperboard;

a plurality of dielectric heaters spaced along the direction of travel of said partially corrugated paperboard each comprising an electrode structure having a plurality of elongated mutually parallel electrodes mounted in said heating section adjacent the aforesaid facing sheet of said partially completed corrugated paperboard at an angle somewhat less than 90° with respect to the orientation of the aforesaid corrugations; and means for supplying high frequency potentials along adjacent pairs of said electrodes of each of said dielectric heaters at a potential operative to cure said adhesive composition and bond the face sheet to the paper web without increasing the moisture content differential of the bonded elements.

14. The method of producing corrugated paperboard having a decreased tendency to warp which comprises:

feeding a single faced transversely corrugated paper web having relatively enhanced moisture content into a doublebacker;

while such web is travelling toward the doublebacker applying to the exposed peaks of the corrugations of such web an adhesive composition having a dielectric loss factor materially higher than the paper stock;

feeding a facing sheet having a relatively decreased moisture content into the doublebacker in contact with the adhesively coated peaks of said corrugations to form a partially completed corrugated paperboard; and exposing the adhesive composition to a substantially transverse high frequency electrostatic field through the facing sheet and having a potential gradient of sufficient intensity to cure said adhesive composition and thereby bond the web to the facing sheet without enhancing their moisture content differential.

15. The method of producing corrugated paperboard having a decreased tendency to warp which comprises:

feeding a single faced transversely corrugated paper web having a relatively enhanced moisture content into a doublebacker;

while such web is travelling toward the doublebacker applying to the exposed peaks of such web a liquid-softened adhesive composition having a dielectric loss factor materially higher than the paper stock;

feeding a facing sheet having a relatively decreased moisture content into the doublebacker in contact with the adhesively coated peaks of said corrugations to form a partially completed corrugated paperboard;

exposing the adhesive composition to a substantially transverse high frequency electrostatic field through the facing sheet and having a potential gradient of sufficient intensity to vaporize a substantial proportion of the liquid in said adhesive composition, thereby effecting a reduction in the dielectric losses of said adhesive composition while partially curing and hardening the same; and exposing the partially cured adhesive composition to a substantially transverse high frequency electrostatic field through the facing sheet and having a substantially increased potential gradient to maintain dielectric losses in said adhesive composition at a high level in compensation for the aforesaid reduction in the dielectric loss factor thereof to effect the final bond of said web to said facing sheet without enhancing their moisture content differential.

References Cited

UNITED STATES PATENTS

| | | |
|---|---|---|
| 1,228,430 | 6/1917 | Hahn _____ 34—162 |
| 2,236,056 | 3/1941 | Grimm. |
| 2,972,196 | 2/1961 | Early et al. _____ 34—1 |
| 3,266,690 | 8/1966 | Goettsch _____ 156—471 X |
| 3,277,580 | 10/1966 | Tooby _____ 34—1 |
| 3,282,764 | 11/1966 | Goettsch _____ 156—292 |

EARL M. BERGERT, *Primary Examiner.*

M. L. KATZ, *Assistant Examiner.*